(12) United States Patent
Kitou (10) Patent No.: US 9,440,571 B2
(45) Date of Patent: Sep. 13, 2016

(54) CONVEYANCE SEAT
(71) Applicant: TOYOTA BOSHOKU KABUSHIKI KAISHA, Aichi-ken (JP)
(72) Inventor: Hidekazu Kitou, Seto (JP)
(73) Assignee: TOYOTA BOSHOKU KABUSHIKI KAISHA, Aichi-Ken (JP)
( * ) Notice: Subject to any disclaimer, the term of this patent is extended or adjusted under 35 U.S.C. 154(b) by 15 days.
(21) Appl. No.: 14/492,555
(22) Filed: Sep. 22, 2014
(65) Prior Publication Data
US 2015/0091359 A1 Apr. 2, 2015
(30) Foreign Application Priority Data
Sep. 30, 2013 (JP) ................. 2013-204171
(51) Int. Cl.
*A47C 7/02* (2006.01)
*B60N 2/68* (2006.01)
*B60N 2/58* (2006.01)
(52) U.S. Cl.
CPC ............. *B60N 2/68* (2013.01); *B60N 2/5825* (2013.01); *B60N 2/682* (2013.01); *B60N 2205/50* (2013.01)
(58) Field of Classification Search
CPC ................................ B60N 2/68; B60N 2/686
USPC ........................................ 297/452.18, 452.2
See application file for complete search history.

(56) References Cited

U.S. PATENT DOCUMENTS

| | | | | | |
|---|---|---|---|---|---|
| 7,066,552 | B2 * | 6/2006 | Yoshida | .................... | B60N 2/64 297/452.18 |
| 8,083,292 | B2 * | 12/2011 | Choi | ........................ | B60N 2/22 297/452.18 |
| 8,539,661 | B2 * | 9/2013 | Gross | .................... | B60N 2/682 29/428 |
| 9,010,855 | B2 * | 4/2015 | Yamaki | ................ | B60N 2/0232 297/216.13 |
| 2004/0113481 | A1 * | 6/2004 | Saberan | ................. | B60N 2/682 297/452.18 |
| 2006/0071514 | A1 * | 4/2006 | Farquhar | .............. | B60N 2/4861 297/61 |
| 2008/0265639 | A1 * | 10/2008 | Siegrist | .................. | B60N 2/686 297/217.3 |
| 2009/0045658 | A1 * | 2/2009 | Humer | ................. | B60N 2/4228 297/216.12 |
| 2010/0171356 | A1 * | 7/2010 | Gross | .................... | B60N 2/682 297/452.18 |
| 2012/0068506 | A1 | 3/2012 | Yamaki et al. | | |
| 2012/0169107 | A1 * | 7/2012 | Sakkinen | ............... | B23K 26/32 297/452.18 |
| 2013/0119741 | A1 * | 5/2013 | Medoro | ................. | B60N 2/686 297/452.18 |
| 2013/0334862 | A1 * | 12/2013 | Gibbs | ................... | B60N 2/682 297/452.18 |

FOREIGN PATENT DOCUMENTS

| | | |
|---|---|---|
| CN | 1819787 | 8/2006 |
| DE | 19905215 | 8/2000 |
| DE | 102007013341 | 9/2008 |

(Continued)

OTHER PUBLICATIONS

Germany Office action, dated Jan. 7, 2015 along with an English translation thereof.

(Continued)

*Primary Examiner* — Laurie K Cranmer
(74) *Attorney, Agent, or Firm* — Greenblum & Bernstein, P.L.C.

(57) ABSTRACT

A conveyance seat includes a pair of side frames and a lower frame. The lower frame is formed to have a U-shaped section, an upper part of which is open, a center part position of a front side area of the U shape is recessed backward relative to both side positions in a view in a width direction of the seat. Cutouts are formed in end surfaces of the lower frame in areas connected with the pair of side frames, and the cutouts are made from the end surfaces to an inner side.

4 Claims, 6 Drawing Sheets

(56) References Cited

FOREIGN PATENT DOCUMENTS

| | | |
|---|---|---|
| DE | 102009035405 | 2/2010 |
| DE | 102010049328 | 4/2012 |
| JP | 2012-126245 | 7/2012 |
| WO | 2009/056294 | 5/2009 |
| WO | 2010/124006 | 10/2010 |

OTHER PUBLICATIONS

Official Action, along with English-language translation thereof, for CN Appl. No. 201410505737.9 dated Apr. 25, 2016.

* cited by examiner

CONVEYANCE SEAT

INCORPORATION BY REFERENCE

The disclosure of Japanese Patent Application No. 2013-204171 filed on Sep. 30, 2013 including the specification, drawings and abstract is incorporated herein by reference in its entirety.

BACKGROUND OF THE INVENTION

1. Field of the Invention

The invention relates to a conveyance seat. Especially, the invention relates to a conveyance seat that includes a pair of side frames arranged as seat back frames on both left and right sides, and a lower frame connecting lower positions of the side frames with each other.

2. Description of Related Art

A conveyance seat of an automobile and so on is made of a seat cushion serving as a seating section for a seated person, a seat back serving as a backrest, and a head rest supporting a head. The seat back has a seat back frame that forms a skeleton of the seat back. A pair of side frames arranged on both left and right sides, an upper frame that connects upper positions of the side frames with each other, and a plate-like lower frame that connects the lower positions of the side frames with each other are arranged into a frame shape, thus structuring the seat back frame. The seat back is able to move in a front-back direction through reclining mechanisms provided in a lower position of the seat back, and is connected with the seat cushion. When positioning mechanisms of the reclining mechanisms are arranged on both left and right sides, an interlocking rotating shaft is arranged in parallel with the above-mentioned lower frame in order to interlock the positioning mechanisms on both sides. The lower frame and the interlocking rotating shaft are positioned to each other as follows. The lower frame is formed to have a U-shaped section, and is arranged so that an opening of the U shape comes to the top. Then, the interlocking rotating shaft is positioned inside the U shape. Thus, even if support load of a seat pad arranged in front of the interlocking rotating shaft acts on the interlocking rotating shaft, the support load of the seat pad does not directly acts on the interlocking rotating shaft, and there is no hindrance in an operation of the reclining mechanisms. In other words, when there is no front side area of the U-shaped lower frame, support load of the seat pad is received by the interlocking rotating shaft as well as a rear side area of the lower frame. In such a case, for example, at a time of rear collision and so on of a conveyance, the seat pad could apply force to the interlocking rotating shaft in a rotating direction due to load received by the seat pad, and the reclining mechanisms could be released carelessly. Also, in a normal state, support load of a seated person applied to the seat pad always acts on the interlocking rotating shaft while the seated person is seated. Therefore, when the reclining mechanisms operate, the support load acts as resistance while the interlocking rotating shaft rotates. In order to solve this problem, the lower frame is formed to have a U-shape section so that support load of the seat pad does not act on the interlocking rotating shaft.

SUMMARY OF THE INVENTION

Figure 7:
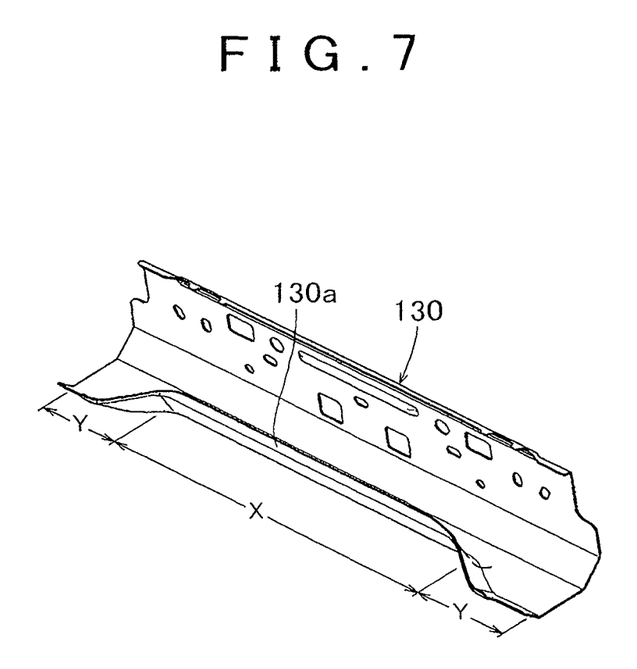
FIG. 7 is a perspective view showing a shape of a lower frame according to the related art.

As stated above, when the lower frame is arranged at the lower position of the seat back with the interlocking rotating shaft arranged inside the U shape, back of the hip of a seated person could contact the front side area of the U-shaped lower frame when the seated person is seated on the seat cushion, and the seated person could feel uncomfortable. In order to solve this problem, as shown in FIG. 7, it is considered that a U-shaped front side area 130a of a lower frame 130 may have a shape in which a center part position X where the hip of the seated person is located is recessed to the back from both side positions Y in a view from a width direction of a seat, so that the back part of the hip of the seated person is prevented from being in contact with the front side area 130a. The lower frame 130 is formed by conducting plastic deformation processing such as pressing on a steel plate having a flat plate shape. When the lower frame 130 shown in FIG. 7 is formed by normal pressing, an expanded shape 130S is a shape shown in FIG. SB. In other words, in the expanded shape 130S, areas of the both side positions Y in the front side area 130a of the lower frame 130 project frontward from an area of the center part position X. When press-cutting the expanded shape 130S from a steel plate material, a rectangular-shaped steel plate material, on which the expanded shape 130S is able to be projected, is prepared, and the expanded shape 130S is press-cut. Therefore, in the steel plate material, the part of the area of the center part position X recessed from the areas of the both side positions Y (the crosshatched area in FIG. 5B) becomes so-called wastage, thereby lowering a yield. In other words, the expanded shape 130S of the lower frame 130 has a width direction length W1 and a front-back direction length L1. It is necessary that L1 is longer than a front-back direction length L2 in the area of the center part position X as the L1 is positioned to project frontward from the both side positions Y, and the material is wasted by an amount shown as a crosshatched part in the center part position X, thereby lowering a yield.

The invention provides a conveyance seat in which a front side area of a lower frame is able to be formed from a rectangular expanded shape even when a center part position is recessed backward from both side positions, thereby improving a yield.

A conveyance seat according to an aspect of the invention includes a pair of side frames and a lower frame. The lower frame is formed to have a U-shaped section, an upper part of which is open. A center part position of a front side area of the U shape is recessed backward relative to both side positions in a view in a width direction of the seat. Cutouts are formed in end surfaces of the lower frame in areas connected with the pair of side frames, and the cutouts are made from the end surfaces to an inner side. Due to the cutouts, the lower frame is formed by plastic deformation processing from a rectangular expanded shape so that the center part position and both side positions of the front side area are different in a front-back direction and the center part position is recessed backward relative to the both side positions. In the above aspect, the cutouts formed in the end surfaces of the lower frame may be formed in a lower position of the U-shaped section. Further, in the above aspect, the lower frame may be fixed and connected to the side frames by welding, and welded spots may be at least set to spots that sandwich the cutouts. In the above structure, when the lower frame is connected to the side frames, the cutouts may become communicating holes.

According to the above-stated aspect of the invention, the center part position of the front side area of the lower frame, where a hip is located when a seated person is seated, is recessed to backward relative to the both side positions of the center part position. Therefore, it is possible to prevent the hip of the seated person from being in contact with the lower frame as much as possible. As a result, seating in a favorable condition is enabled. In addition, according to the aspect of the invention, the cutouts are formed in the connecting end surfaces of the lower frame to the inner side. Due to the cutouts, the lower frame is formed by plastic deformation processing from a rectangular expanded shape so that the center part position and the both side positions of the front side area are different in a front-back direction, and the center part position is recessed backward relative to the both side positions. Therefore, it is possible to eliminate material wastage, thereby improving a yield.

According to the aspect of the invention, even in the case where the center part position of the front side area of the lower frame is recessed backward relative to the both side positions, since the cutouts are provided on the end surfaces, it is possible to have a rectangular expanded shape before forming. Thus, a yield is improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
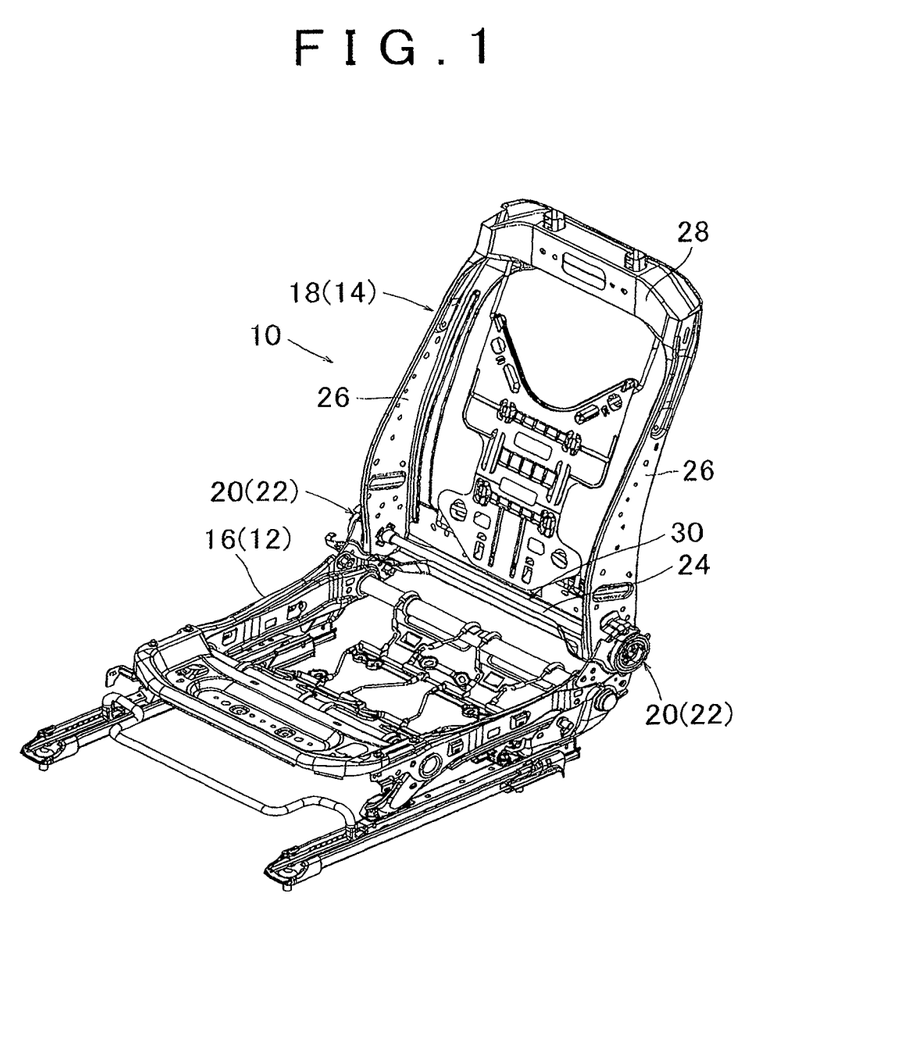
FIG. 1 is a perspective view showing a state where a seat cushion frame and a seat back frame, which form a skeleton of a seat according to an embodiment of the invention, are arranged.
Figure 2:
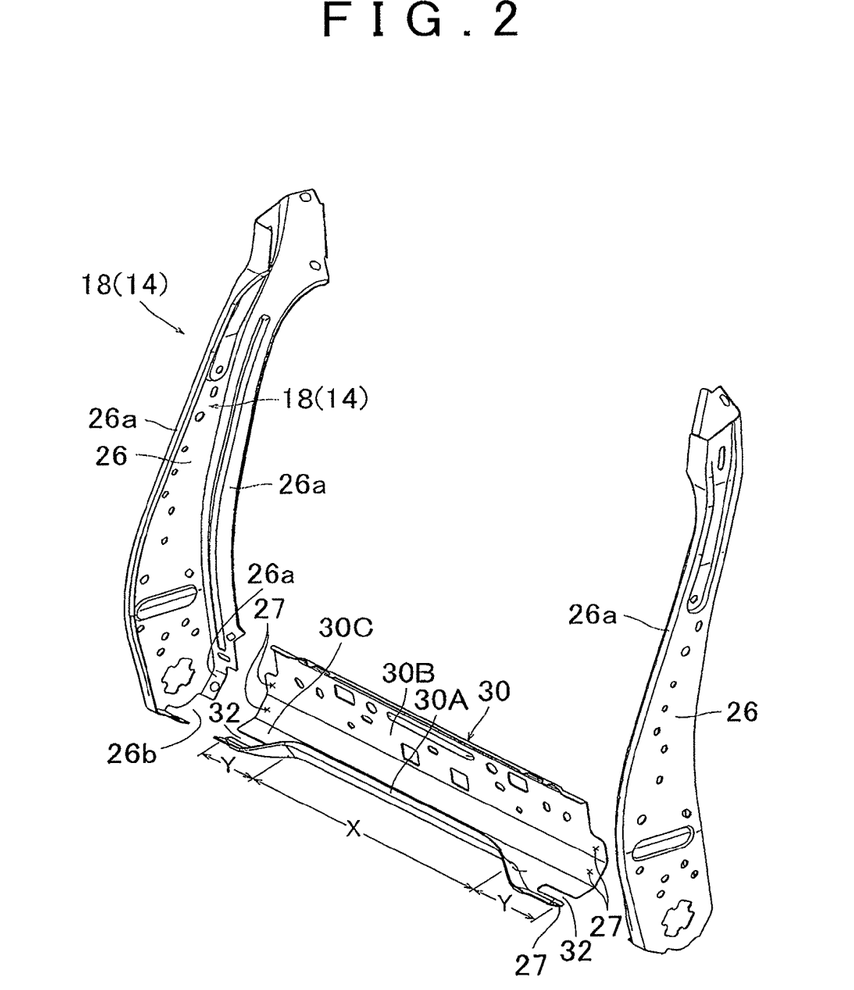
FIG. 2 is an exploded perspective view showing a state where areas of connection structures between side frames and a lower frame, which structure the seat back frame according to the embodiment, are exploded.
Figure 3:
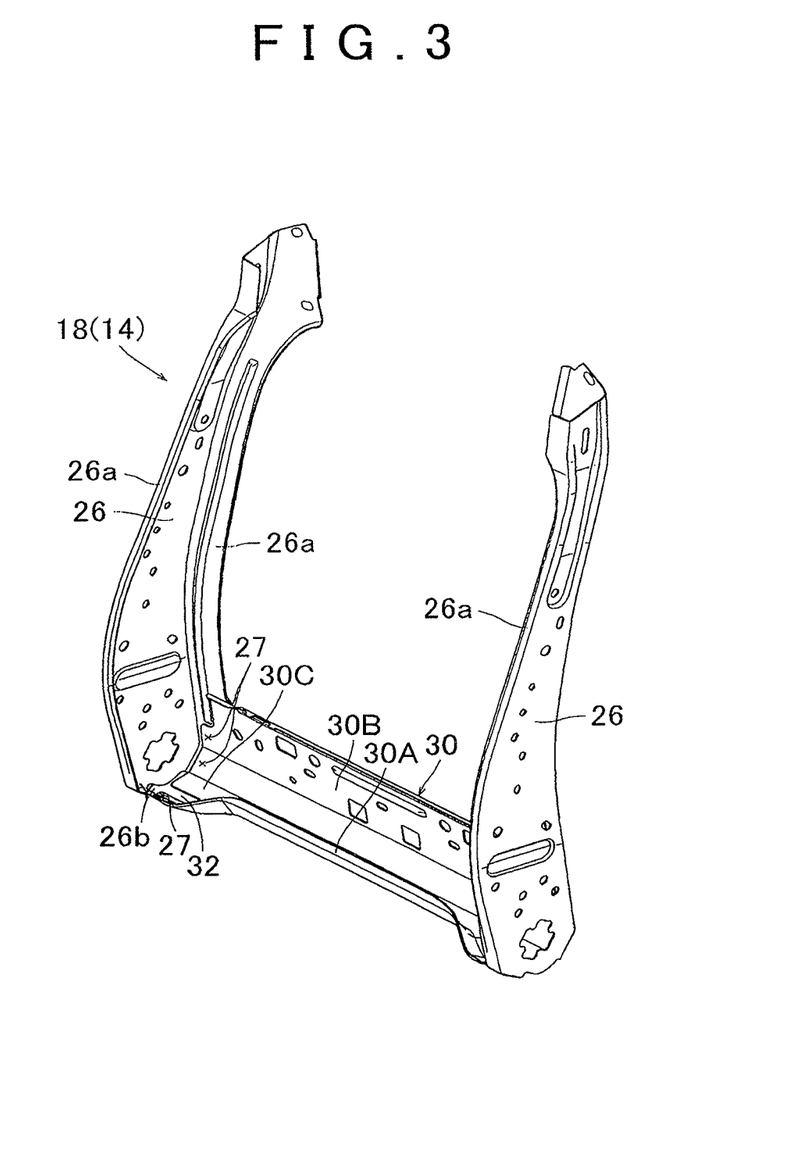
FIG. 3 is a perspective view showing a state where the areas of the connection structures shown in FIG. 1 are connected.

An embodiment of the invention is explained below by using the drawings. Directional expressions in this description such as upper, lower, left, right, front and back explain directions viewed by a seated person seated on a seat. FIG. 1 shows a state where a seat cushion frame 16 and a seat back frame 18 of a conveyance seat 10 (herein after, also simply referred to as a "seat 10"), which is represented by a seat in an automobile, are arranged. The seat 10 is structured by a seat cushion 12 serving as a seating section for a seated person, a seat back 14 serving as a backrest, and a head rest (not shown) supporting a head. The seat cushion frame 16 forms a skeleton of the seat cushion 12, and the seat back frame 18 forms a skeleton of the seat back 14. The seat back 14 is connected with a rear position of the seat cushion 12 at a lower position of the seat back 14 by reclining mechanisms 20 so that the seat back 14 is able to tilt in a front-back direction. The reclining mechanisms 20 according to this embodiment include positioning mechanisms 22 for tilting positions and arranged on both left and right sides, respectively. In order to interlock the positioning mechanisms 22 on both left and right sides, an interlocking rotating shaft 24 is arranged between and connected with the reclining mechanisms 20, 20 on both left and right sides. The seat back frame 18 that forms the skeleton of the seat back 14 is structured by side frames 26, 26 arranged on both left and right sides, an upper frame 28 arranged on an upper position, and a lower frame 30 arranged on a lower position, and is formed into a frame shape. FIG. 2 and FIG. 3 are views of the side frames 26 and the lower frame 30 abstracted from the seat back frame 18, and show connection structures between both of the side frames 26 and the lower frame 30. FIG. 2 shows an exploded state, and FIG. 3 shows a connected state. The side frame 26 is formed into a plate-like long shape, and a flange part 26a is formed by bending an end part of the side frame 26. The flange part 26a is continuously formed from both ends through the lower position of the side frame 26. However, the flange part 26a is absent in a part 26b at the lower position.

Figure 4:
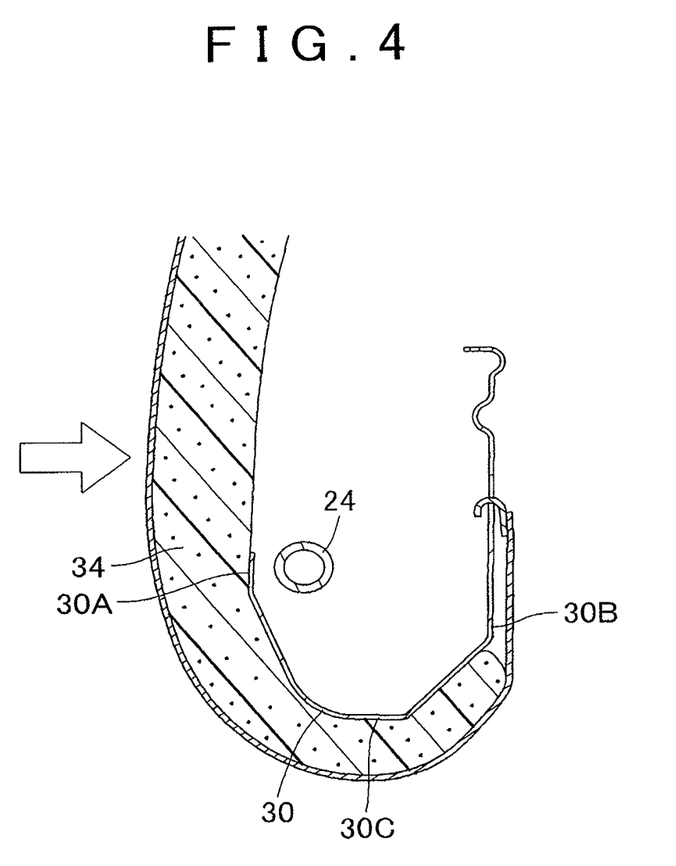
FIG. 4 is a schematic side view showing a state where a lower position of the seat back is arranged.

The lower frame 30 is formed to have a U-shaped section by plastic deformation processing of a flat-plate-shaped plate member. Since the lower frame 30 has the U shape, the lower frame 30 is made of a front side area 30A, a rear side area 30B, and a bottom surface area 30C. As shown in FIG. 2 and FIG. 3, the lower frame 30 is connected with the side frames 26 by superimposing end parts of the lower frame 30 on inner surfaces of the arc-shaped flange parts 26a formed in lower parts of the side frames 26 and welding together. There are three welded spots 27 marked by x, and welding is conducted at positions on both sides of cutouts 32 described later. The interlocking rotating shaft 24, which connects the reclining mechanisms on both left and right sides with each other as shown in FIG. 1, is arranged at an inner position of the U-shape section of the lower frame 30. Thus, as shown in FIG. 4, even when load in a backward direction acts on a seat pad 34 arranged in front of these members 30, 24, load of the seat pad 34 is received by the front side area 30A of the lower frame 30, and the seat pad 34 is prevented from being in contact with the interlocking rotating shaft 24, thereby causing no influence on an operation of the interlocking rotating shaft. In the U-shaped front side area 30A of the lower frame 30, a center part position X in a view in a width direction of the seat 10, where the hip of a seated person is located, is arranged at a position recessed backward from both side positions Y. Thus, when the hip of the seated person is located on the seat cushion 12, the lower frame 30 does not become an obstacle. The parts of the lower frame 30 connecting with the side frames 26 are formed into large arc shapes, in which the both side positions Y of the lower frame 30 are located frontward. This is advantageous in improving connection strength between the lower frame 30 and the side frames 26, and accordingly rigidity of the frame shape of the seat back frame 18.

In this embodiment, the shape of the lower frame 30, in which the both side positions Y in the front side area 30A are positioned frontward from the center part position X, is made possible due to the cutouts 32 formed from both ends of the lower frame 30 to the inner side. As shown well in FIG. 2 and FIG. 3, the cutout 32 is formed at a boundary position between the front side area 30A and the bottom surface area 30C of the U shape. Then, the cutouts 32 are formed at the same positions as those of the foregoing parts 26b of the side frames 26, in which the flange parts 26a are absent, when both ends of the lower frame 30 are connected with the lower positions of the side frames 26. When both of the lower frame 30 and the side frames 26 are connected with each other, the parts 26b and cutouts 32 become communicating holes. Through the communicating holes, it is possible to mount apparatuses equipped inside the seat back 14. In this embodiment, a motor (not shown) for operating the reclining mechanism 20 is equipped at an upper position of the communicating hole, and the communication hole is used for mounting the motor.

Figure 5A:
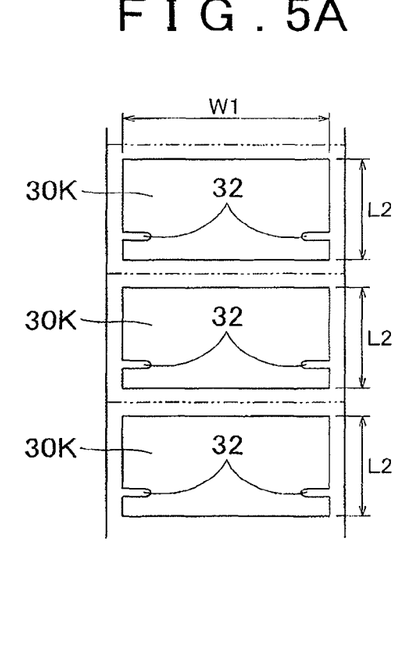
FIG. 5A is a layout view of a state where the lower frames are arrayed when conducting press cutting of an expanded shape of the lower frame in a case where a cutout is formed.
Figure 5B:
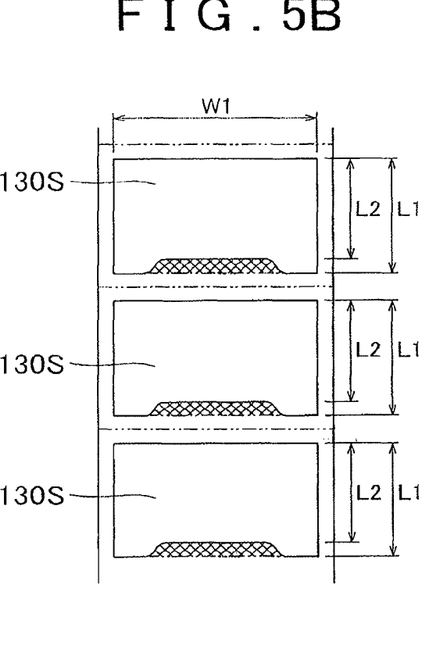
FIG. 5B is a layout view of a state where lower frames are arrayed when conducting press cutting of an expanded shape of the lower frame in a case where the cutout is not formed.

Next, how to form the lower frame 30 according to this embodiment is explained. As shown in FIG. 5A, the lower frame 30 according to this embodiment is normally formed by conducting punching cutting of an expanded shape 30K of the lower frame 30 by pressing or the like from a flat-plate-shaped member drawn out from a rolled steel plate material. The expanded shape 30K according to this embodiment has an oblong rectangular shape with a width direction length W1 and a front-back direction length L2, and the cutouts 32 are made from end surfaces in a width direction to an inner side. As stated earlier, the cutout 32 is made at the boundary position between the front side area 30A and the bottom surface area 30C. The cutting length of the cutout 32 to the inner side is selected in accordance with the length of the both side positions Y. The lower frame 30 in the expanded shape 30K is first formed by plastic deformation such as press forming so that center part position X has the U-shaped section. Thereafter, the both side positions Y of the front side area 30A with the cutouts 32 are deformed frontward, thereby making the shape of the lower frame 30 shown in FIG. 2. In other words, the center part position X is recessed backward relative to the both side positions Y. The lower frame 30 formed as shown in FIG. 2 is welded at the three welded spots 27 marked by x as shown in FIG. 3, and is joined and bonded to the side frames 26. As stated earlier, welding is conducted at the welded spots 27 located on both sides of the cutouts 32. Therefore, bonding is strong even with the cutouts 32.

As stated earlier, the expanded shape 30K of the lower frame 30 according to the embodiment has the oblong rectangular shape. Therefore, when cutting out the expanded shape 30K from the steel plate material, it is possible to eliminate wastage that is shown by crosshatching in the case of the expanded shape 130S shown in FIG. 5B, thereby improving a yield.

Figure 6:
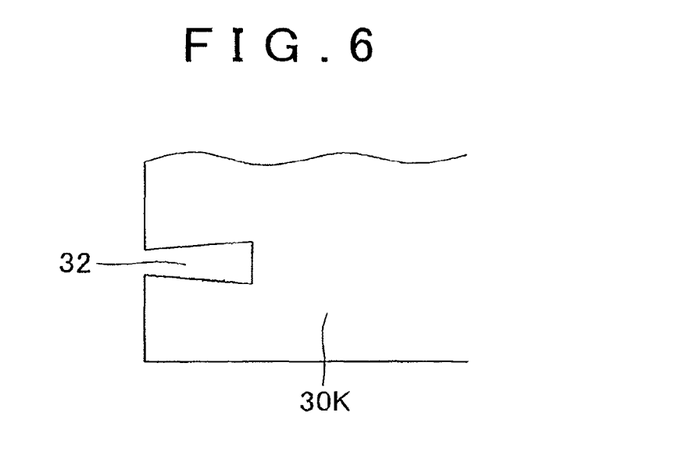
FIG. 6 is a view showing an modified example of the cutout.

The embodiment of the invention has been explained. However, the invention may be carried out in various other forms. For example, various other shapes are considered for the cutout 32 like a modified example shown in FIG. 6. The cutout according to the modified example shown in FIG. 6 is a trapezoidal shape that is wider on an inner side.

What is claimed is:

1. A conveyance seat comprising:
 a pair of side frames arranged on left and right sides of the seat and defining seat back frames; and
 a lower frame connecting lower positions of the pair of side frames with each other, the lower frame including:
  a front side area with a center part position and side positions adjacent to the center part position, the center part position being recessed backward relative to the side positions;
  a rear side area arranged behind the front side area in a front-back direction of the vehicle seat;
  a bottom surface area arranged between the front side area and the rear side area such that the lower frame defines a U-shape with an open upper part above the bottom surface area in a height direction of the seat; and
 cutouts provided in end surfaces of the bottom surface area in areas connected with the pair of side frames, and each of the cutouts extends in a width direction of the seat from respective terminal ends of the bottom surface area towards a center of the bottom surface area.

2. The conveyance seat according to claim 1, wherein the center part position of the front side area that is recessed backward relative to the side positions of the front side area is plastically deformed relative to the side positions of the front side area.

3. The conveyance seat according to claim 1, wherein the lower frame is fixed and connected to the side frames by welding to define welded spots, and
 the welded spots are located on the lower frame at opposite sides of the cutouts in the front-back direction of the vehicle seat.

4. The conveyance seat according to claim 3, wherein the lower frame is connected to the side frames such that the cutouts define communicating holes.

* * * * *